United States Patent

Soga et al.

[11] Patent Number: 6,035,331
[45] Date of Patent: Mar. 7, 2000

[54] NETWORK MANAGING SYSTEM WITH USER INTERFACE FOR MANAGING PLURAL LAYERS AND MANAGING METHOD FOR THE SAME

[75] Inventors: Kenji Soga; Hiroyuki Kawakami; Katsuyuki Tanaka, all of Tokyo, Japan

[73] Assignee: NEC Corporation, Japan

[21] Appl. No.: 08/956,667

[22] Filed: Oct. 23, 1997

[30] Foreign Application Priority Data

Oct. 25, 1996 [JP] Japan .................................... 8-301286

[51] Int. Cl.[7] .............................. G06F 13/00; H04J 3/02
[52] U.S. Cl. ......................... 709/223; 709/201; 709/250
[58] Field of Search .................................. 709/223, 201, 709/250; 370/408

[56] References Cited

U.S. PATENT DOCUMENTS

| | | | |
|---|---|---|---|
| 5,544,314 | 8/1996 | Fuchsreiter et al. ................... | 709/223 |
| 5,561,769 | 10/1996 | Kumar et al. . | |
| 5,651,006 | 7/1997 | Fujino et al. ........................... | 370/408 |
| 5,751,966 | 5/1998 | Dauerez et al. ........................ | 709/224 |
| 5,793,958 | 8/1998 | Clement et al. ........................ | 709/220 |
| 5,892,916 | 4/1999 | Gehlhaar et al. ....................... | 709/223 |

FOREIGN PATENT DOCUMENTS 7-226777  8/1995  Japan .

OTHER PUBLICATIONS

Office Action Issued by the Japanese Patent Office on Mar. 2, 1999 in the Corresponding Japanese Application and an English Translation Thereof.

An Implementation of Integrated Multilayer Management System for Broadband Access Systems—Proceedings of the 1996 IEICE General Conference, The Institute of Electronics, Information and Communication Engineers, 1996, p. 312.

Widl W: "CCITT Standardisation of Telecommunications Management Networks" Ericsson Review, vol. 68, No. 2, Jan. 1, 1991, pp. 34–51 *The Whole Document*.

Smith R et al: "Distributed Management of Future Global Multi–Service Networks" British Telecommunications Engineering, vol. 13, No. Part 03, Oct. 1, 1994, pp. 221–226, *The Whole Document*.

Post M et al: "The Manager/Agency Paradigm for Distributed Network Management" 1996 IEEE Network Operations and Management Symposium (NOMS), Kyoto, Apr. 15–19, 1996, vol. 1, No. Symp. 5, Apr. 15, 1996, pp. 44–53, Institute of Electrical and Electronics Engineers *The Whole Document*.

*Primary Examiner*—Krisna Lim
*Attorney, Agent, or Firm*—Ostrolenk, Faber, Gerb & Soffen, LLP

[57] ABSTRACT

In a hierarchical network managing system, an upper layer manager manages at least one upper layer agent. An upper layer user interface is provided for the upper layer manager and can communicate with the upper layer manager. A lower layer manager manages at least one lower layer agent. A lower layer user interface is provided for the lower layer manager and can communicate with the lower layer manager and the upper layer user interface.

16 Claims, 3 Drawing Sheets

NETWORK MANAGING SYSTEM WITH USER INTERFACE FOR MANAGING PLURAL LAYERS AND MANAGING METHOD FOR THE SAME

BACKGROUND OF THE INVENTION

1. Field of the Invention

The present invention relates to a network managing system, and more particularly to a network managing system for a network with a plurality of layers which has a user interface for managing agents of the plurality of layers.

2. Description of the Related Art

In a conventional hierarchical network managing system, a network is managed by configuration of a sub-manager layer and an integrated manager layer. Alternatively, a network is managed by configuration of an element management layer, a network management layer, and a service management layer which are formed in accordance with the ITU'S (Internation Telecommunication Union) TMN (Telecommunications Management Network) in layer structure. Also, each of the layers has managers and agents, and the manager provides a user interface with an operator.

A conventional example of the hierarchical network managing system is proposed in, for example, Japanese Laid Open Patent Disclosure (JP-A-Heisei 7-226777) in which a communication service between the integrated manager and the sub-manager is performed based on the IAB management standard. Thus, the structure of the sub-manager is simplified thereby for simplifying the whole structure of the managing system.

The above conventional example of the hierarchical network managing system will be described below with reference to FIG. 1. Referring to FIG. 1, the conventional hierarchical network managing system is composed of an integrated manager 50 as an upper layer manager, and sub-managers 10a and 10b as lower layer managers and agents 20a to 20d as lower layer agents for hierarchically managing a network. For purpose of operating the agent 20, the integrated manager 50 has a path passing through the sub-manager 10 and a direct path without passing through the sub-manager 10. Also, the integrated manager 50 is equipped with a graphical user interface 60.

However, the conventional example of the hierarchical network managing system has the following problems.

(1) The first problem is that the upper layer user interface and the lower layer user interface cannot cooperate with each other in the conventional hierarchical network managing system described in the above Japanese Laid Open Patent Disclosure (JP-A-Heisei 7-226777). The reason is that the user interface for the user to operate an agent from the sub-manager is not provided in the above conventional hierarchical network managing system.

(2) The second problem is that the integrated manager is always required to operate a sub-manager, in the conventional hierarchical network managing system mentioned in the above Japanese Laid Open Patent Disclosure (JP-A-Heisei 7-226777). The reason is that in the above conventional hierarchical network managing system, processing to the sub-manager can be performed only from the integrated manager, and there is not a user interface which is directly connected to the sub-manager.

SUMMARY OF THE INVENTION

Therefore, the present invention is accomplished in the view of the above problems. An object of the present invention is to provide a hierarchical network managing system method in which an upper layer user interface and an lower layer user interface can cooperate so that the operativity is improved.

Another object of the present invention is to provide a hierarchical network managing system method in which the system is restrained to have an appropriate system scale.

In order to achieve an aspect of the present invention, a hierarchical network managing system includes at least one upper layer agent, an upper layer manager for managing the at least one upper layer agent, an upper layer user interface which is provided for the upper layer manager and which can communicate with the upper layer manager, at least one lower layer agent, a lower layer manager for managing the at least one lower layer agent, and a lower layer user interface provided for the lower layer manager and which can communicate with the lower layer manager and the upper layer user interface.

In this case, the upper layer user interface and the lower layer user interface may form an integrated user interface module. Alternatively, the upper layer user interface and the lower layer user interface may be provided as an upper layer user interface module and a lower layer user interface module which are separated from each other.

The upper layer user interface communicates with the lower layer user interface when a request inputted from a user through the upper layer user interface requires processing of the lower layer agent. In this case, the upper layer user interface issues a first processing request for first processing to the upper layer agent, and the upper layer agent performs the first processing in response to the first request while the upper layer agent communicates with the lower layer agent through the lower layer manager, if necessary. At that time, the upper layer user interface issues a second processing request to the lower layer user interface, when the first processing is ended, and the lower layer user interface issues a second request for the second processing to the lower layer agent through the lower layer manager when the second request is inputted from the user through the lower layer user interface. The lower layer user interface issues an end notice to the upper layer user interface when the second processing is ended in the lower layer agent, and the upper layer user interface ends the processing for the request inputted from the user.

In order to achieve another aspect of the present invention, in a managing system of a network of a plurality of layers, each of the plurality of layers includes a plurality of managers, a plurality of agents connected to the plurality of managers, and a plurality of user interfaces, each of which is provided for one of the plurality of managers independently from the one manager, for interfacing with a user.

In order to achieve still another aspect of the present invention, a method of managing a plurality of layer in a hierarchical network managing system, includes the steps of:

inputting a request from a user through an upper layer user interface; and issuing a first processing request for first processing from an upper layer user interface to an upper layer agent through an upper layer manager when the request is inputted from the user.

DESCRIPTION OF THE PREFERRED EMBODIMENTS

The hierarchical network managing system of the present invention will be described in detail with reference to the attached drawings.

Figure 1:
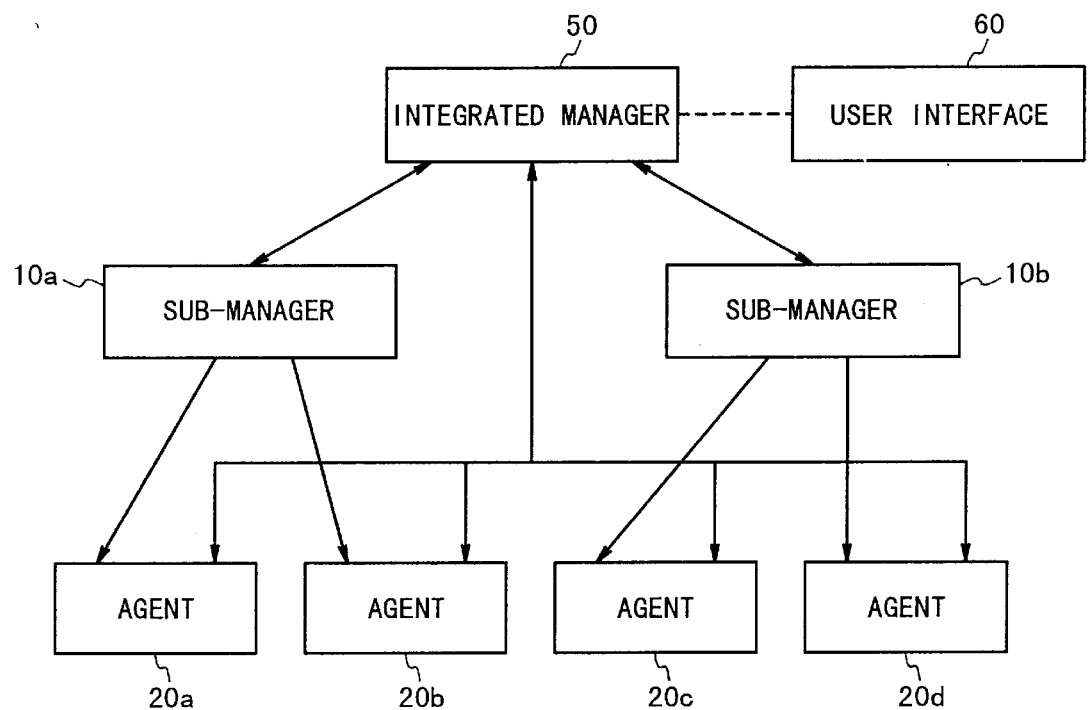
FIG. 1 is a block diagram illustrating the structure of a conventional hierarchical network managing system.
Figure 2:
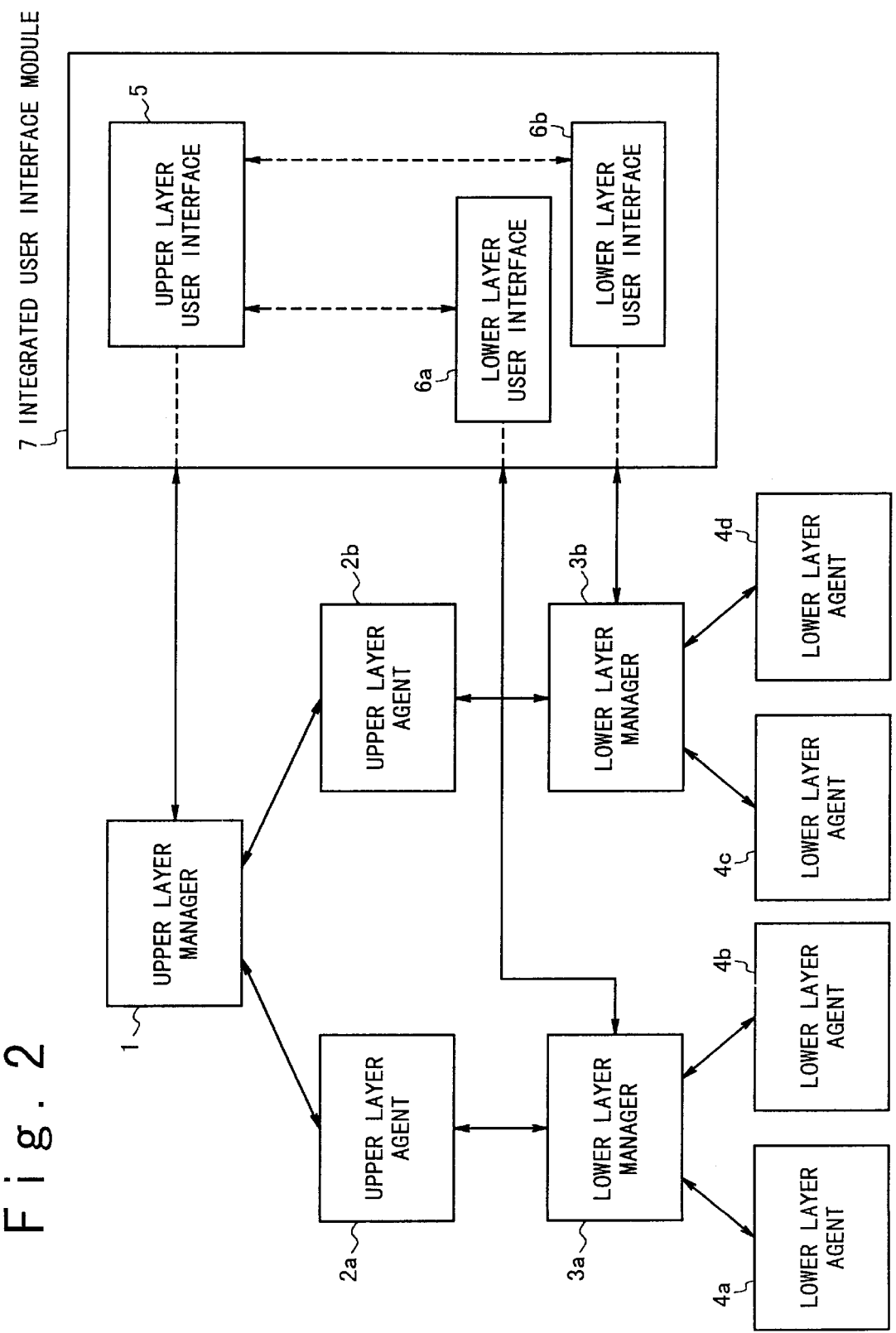
FIG. 2 is a block diagram illustrating the structure of a hierarchical network managing system according to a first embodiment of the present invention.

FIG. 2 is a block diagram illustrating the structure of the hierarchical network managing system according to the first embodiment of the present invention. Referring to FIG. 2, the hierarchical network managing system in the first embodiment is composed of an upper layer manager 1, a plurality of upper layer agents 2 (2a, 2b) which are connected to the upper layer manager 1, a plurality of lower layer managers 3 (3a, 3b) which are respectively connected to the upper layer agents 2, lower layer agents 4 (4a to 4d), one or more of which are connected to each of the plurality of lower layer managers 3.

As shown in FIG. 2, in the hierarchical network managing system in the first embodiment, a user interface function for the user to use the upper layer manager 1 is separated from the upper layer manager 1 as an upper layer user interface 5. Also, a user interface function for the user to use the lower layer manager 3 is separated from the lower layer manager 3 as a lower layer user interface 6. That is, the lower layer user interfaces 6 (6a and 6b) are provided for the lower layer managers 3 (3a and 3b), respectively. The upper layer user interface 5 and the lower layer user interface 6 are integrated to form an integrated user interface module 7, and are connected to the upper layer manager 1 and the lower layer managers 3.

Next, the operation of the hierarchical network managing system according to the first embodiment of the present invention will be described.

When the user wants to effect processing in the upper layer agent 2, the user issues a processing request to the upper layer manager 1 using the upper layer user interface 5 of the integrated interface module 7. The upper layer manager 1 issues a request including the processing request to the upper layer agent 2, and the upper layer agent 2 performs the processing in response to the processing request.

When confirmation from or setting to the lower layer agent 4 is necessary during processing by the upper layer agent 2, the upper layer agent 2 issues a confirmation request or a setting request to the lower layer manager 3. In response to the request, the lower layer manager 3 issues a confirmation request including the confirmation request from the corresponding upper layer agent 2 or a reply request to the lower layer agent 4.

The lower layer agent 4 answers a reply to the requested confirmation or the requested reply to the lower layer manager 3. In response to the reply, the lower layer manager 3 further replies to the upper layer agent 2.

The upper layer agent 2 uses the reply from the lower layer agent 4 if necessary. The upper layer agent 2 replies to the upper layer manager 1 when processing ends. The upper layer manager 1 replies to the upper layer user interface 5 of the integrated user interface module 7 and then ends processing.

On the other hand, when the user operates the lower layer agent 4, a processing request is issued to the lower layer manager 3 using the lower layer user interface 6 of the integrated interface module 7.

The lower layer manager 3 issues a request including the request from the lower layer user interface 6 to the lower layer agent 4. The lower layer agent 3 starts processing in response to the processing request. When processing ends, the lower layer agent 4 replies to the lower layer manager 3. The lower layer manager 3 replies to the lower layer user interface 6 of the integrated user interface module 7 and then ends processing.

Also, when the user needs to operate the lower layer agent 4 after an operation to the upper layer agent 2, the operator issues a request for processing to the upper layer manager 1 using the upper layer user interface 5 of the integrated interface module 7.

The upper layer manager 1 issues a request to the upper layer agent 2, and the upper layer agent 2 starts the processing in response to the processing request.

When processing ends, the upper layer agent 2 replies to the upper layer manager 1. The upper layer manager 1 replies to the upper layer user interface 5 of the integrated user interface module 7. The upper layer user interface 5 issues a request to the lower layer user interface 6 in response to the reply from the upper layer manager 1. The lower layer user interface 6 promotes an operator to input an instruction or data in response to the request.

Next, the operator issues a request to the lower layer manager 3 from the lower layer user interface 6. The lower layer manager 3 receives this request and issues a request to the lower layer agent 4. The lower layer agent 3 which receives this request performs requested process.

When processing ends, the lower layer agent 4 replies to the lower layer manager 3. In response to this, the lower layer manager 13 replies to the lower layer user interface 6 of the integrated user interface module 7. The lower layer user interface 6 replies to the upper layer user interface 5. Thus, the cooperation between the upper layer and the lower layer ends.

The structure having a 2 layer hierarchy is illustrated in FIG. 2 for simplification of the description. However, the present invention is not limited to a 2 layer hierarchy. A similar structure and operation can be performed using a hierarchy of three or more layers.

A specific example in the above embodiment of the first embodiment of the present invention will be described below taking as an example the TMN layer structure in ITU.

This layer structure has a plurality of layers composed of a business management layer, a service management layer, a network management layer, and an element management layer from the uppermost layer. Here, it is assumed that the upper layer is the service management layer and the lower layer is the network management layer. The service management layer provides customer management or service receiving person management such as subscription to and secession from service. The network management layer provides network structural management, network fault management and so on.

In this example, the operation of this hierarchical network managing system will be described, taking as an example processing when a new subscriber to the service is accepted. In this type of processing, after processing of a service subscriber registration is performed in the service management layer, additional processing of network equipment for this service subscriber is needed in the network management layer.

Referring to FIG. 2, first, the user sends a service subscription registration request from the integrated user interface module 7 to the upper layer manager 1 using the upper layer user interface 5.

The upper layer manager 1 sends a service subscription registration request to the upper layer agent 2. The upper layer agent 2 processes the subscriber registration. In the subscriber registration process which is performed by the upper layer agent 2, it is necessary to confirm whether or not it is possible to add network equipment for the service subscribers to the lower layer agent 3. For this reason, the upper layer agent 2 issues a confirmation request to the lower layer manager 3 and then the lower layer manager 3 issues a confirmation request to the lower layer agent 4.

The lower layer agent 4 sends a confirmation reply to the lower layer manager 3, after the confirmation. The lower layer manager 3 sends a confirmation reply to the upper layer agent 2. If the confirmation reply indicates that the addition is possible, the upper layer agent 2 performs the service subscriber registration.

When the registration processing ends, the upper layer agent 2 sends a service subscriber registration reply to the upper layer user interface 5 of the integrated user interface 7 through the upper layer manager 1, and then ends the service subscription registration processing.

Next, the network equipment for this new service subscriber are added. When the service subscription registration processing ends, the upper layer user interface 5 issues an addition request to the lower layer user interface 6. The lower layer user interface 6 which receives the addition request for the network equipment opens an addition screen on the display terminal and promotes an operator. The operator demands the addition of the network equipment from to the lower layer manager 3 via the lower layer user interface 6 using this addition screen.

The lower layer manager 3 requests the addition of the network equipment from to the lower layer agent 4. The lower layer agent 4 performs processes the addition of the network equipment. Then, the lower layer agent 4 replies to the lower layer user interface 6 of the integrated user interface 7 through the lower layer manager 3.

The lower layer user interface 6 sends out an end notice of the addition processing of the network equipment to the upper layer user interface 5. When the upper layer user interface 5 receives the end notice of the addition processing of the network equipment, the lower layer agent 4 ends this instance of service subscriber subscription processing.

Figure 3:
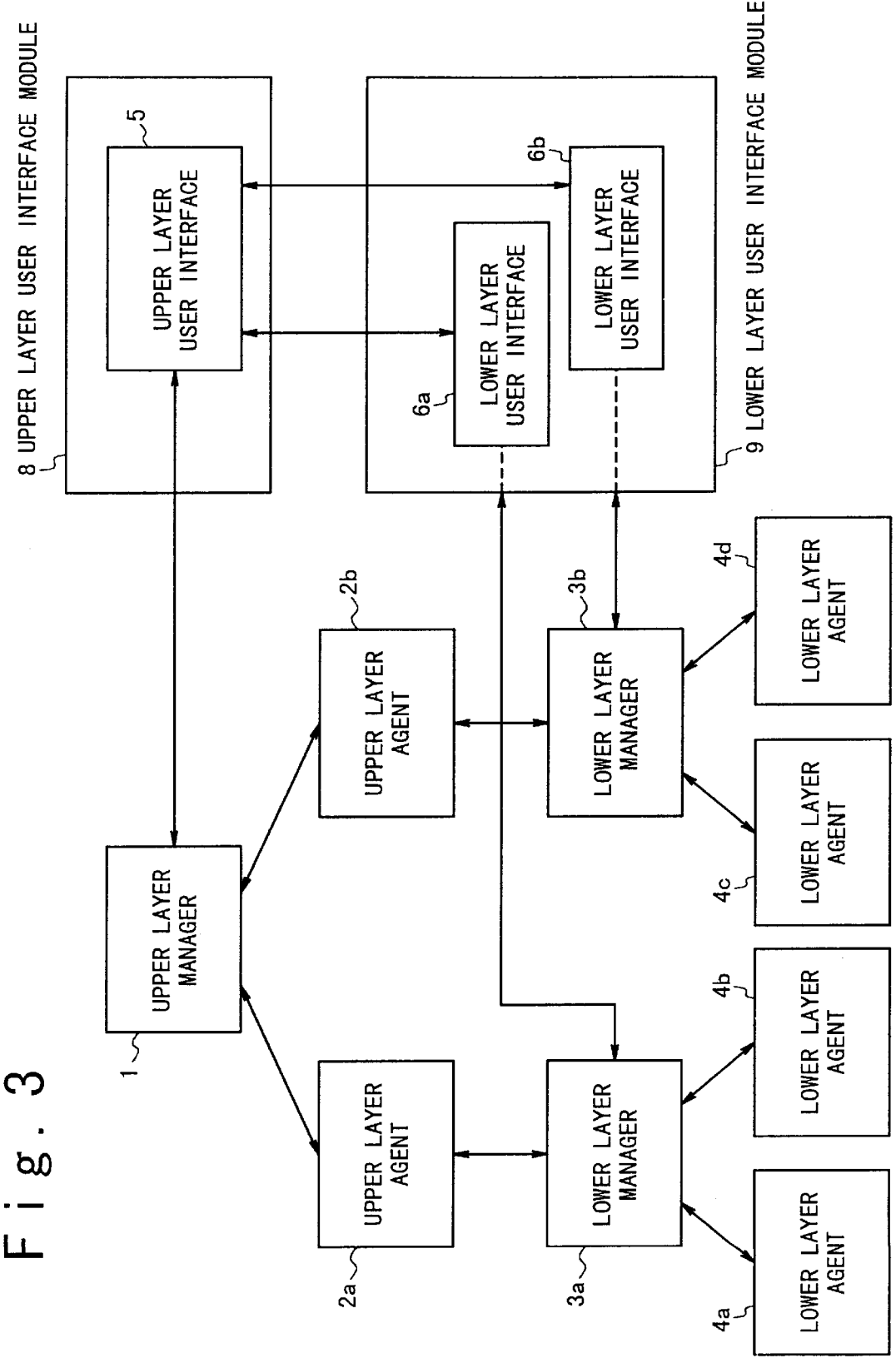
FIG. 3 is a block diagram illustrating the structure of the hierarchical network managing system according to a second embodiment of the present invention.

Next, the hierarchical network managing system according to the second embodiment of the present invention will be described. FIG. 3 is a diagram illustrating the structure of the hierarchical network managing system according to the second embodiment of the present invention.

Referring to FIG. 3, the hierarchical network managing system in the second embodiment is constructed in such a manner that the integrated interface module 7 shown in FIG. 2 is divided into an upper layer user interface module 8 and a lower layer interface module 9, and the upper layer user interface module 8 and the lower layer user interface module 9 respectively contain the upper layer user interface 5 and the lower layer user interface 6.

Operation in which the upper layer and the lower layer cooperate with each other can be performed. Also, the operation of the upper layer agents 2 and the operation of the lower layer agents 4 can be independently performed.

Also, when operation to the upper layer agent 2 is unnecessary, it is possible that only the lower layer user interface module 9 need be provided. On the contrary, when the operation to the lower layer agent 4 is unnecessary, it is possible that only the upper layer user interface module 8 need be provided. Thus, the present embodiment has an advantage in that the scale of the system can be reduced to an appropriate size.

As described above, in accordance with the present invention, the following effects can be achieved.

(1) The first effect of the present invention is in that processes in which the upper layer user interface and the lower layer user interface are integrated can be performed. The reason is that a communication interface is added between the upper layer user interface and the lower layer user interface in the present invention.

(2) The second effect of the present invention is in that only the user interface which the operator needs can be provided, so that the system configuration with an appropriate scale can be used. The reason is that the upper layer manager and the upper layer user interface are separated and the lower layer manager and the lower layer user interface are separated in the present invention.

What is claimed is:

1. A hierarchical network managing system comprising:
   at least one upper layer agent;
   an upper layer manager for managing said at least one upper layer agent;
   an upper layer user interface which is provided for said upper layer manager and which can communicate with said upper layer manager;
   at least one lower layer agent;
   a lower layer manager for managing said at least one lower layer agent; and
   a lower layer user interface provided for said lower layer manager and which can communicate with said lower layer manager and said upper layer user interface.

2. A hierarchical network managing system according to claim 1, wherein said upper layer user interface and said lower layer user interface form an integrated user interface module.

3. A hierarchical network managing system according to claim 1, wherein said upper layer user interface and said lower layer user interface are provided as an upper layer user interface module and a lower layer user interface module which are separated from each other.

4. A hierarchical network managing system according to claim 1, wherein said upper layer user interface communicates with said lower layer user interface when a request inputted from a user through said upper layer user interface requires processing by said lower layer agent.

5. A hierarchical network managing system according to claim 4, wherein said upper layer user interface issues a first processing request for first processing to said upper layer agent, and said upper layer agent performs said first processing in response to said first request while said upper layer agent communicates with said lower layer agent through said lower layer manager, if necessary.

6. A hierarchical network managing system according to claim 5, wherein said upper layer user interface issues a second processing request to said lower layer user interface, when said first processing is ended, and said lower layer user interface issues a second request for the second processing to said lower layer agent through said lower layer manager when the second request is inputted from the user through said lower layer user interface.

7. A hierarchical network managing system according to claim 6, wherein said lower layer user interface issues an end notice to said upper layer user interface when said second processing is ended in said lower layer agent, and said upper layer user interface ends the processing for the request inputted from the user.

8. A network managing system, said network managing system comprising a plurality of layers, each of said plurality of layers having:

a plurality of managers;

a plurality of agents connected to said plurality of managers; and a plurality of user interfaces, each of which is provided for one of said plurality of managers independently from the others of said plurality of managers.

9. A network managing system according to claim 8, wherein said user interfaces for said plurality of layers form an integrated user interface module.

10. A network managing system according to claim 9, wherein said user interfaces for said plurality of layers communicate with each other.

11. A network managing system according to claim 8, wherein one of said plurality of user interfaces for one of said layers is independent of the others of said user interfaces corresponding to the others of said layers.

12. A network managing system according to claim 11, wherein said user interfaces for said plurality of layers communicate with each other.

13. A method of managing a plurality of layers in a hierarchical network managing system, comprising the steps of:

inputting a request from a user through an upper layer user interface;

issuing a first processing request for first processing from an upper layer user interface to an upper layer agent through an upper layer manager when the request is inputted from the user; and issuing a second processing request from said upper layer user interface to a lower layer user interface, when said first processing is ended.

14. A method according to claim 13, further comprising the step of:

performing said first processing in response to said first request by said upper layer agent while said upper layer agent communicates with a lower layer agent through a lower layer manager, if necessary.

15. A method according to claim 14, further comprising the steps of:

prompting the user to input a second processing request for second processing; and issuing the second request from said lower layer user interface to said lower layer agent through a lower layer manager in response to the input from the user.

16. A method according to claim 15, further comprising the step of:

issuing an end notice from said lower layer user interface to said upper layer user interface when said second processing is ended in said lower layer agent; and ending the processing for the request inputted from the user in said upper layer user interface.

* * * * *